United States Patent
Cagan (10) Patent No.: US 7,599,882 B2
(45) Date of Patent: Oct. 6, 2009

(54) METHOD FOR MORTGAGE FRAUD DETECTION

(75) Inventor: Christopher L. Cagan, Los Angeles, CA (US)

(73) Assignee: First American CoreLogic, Inc., Santa Ana, CA (US)

( * ) Notice: Subject to any disclaimer, the term of this patent is extended or adjusted under 35 U.S.C. 154(b) by 917 days.

(21) Appl. No.: 10/713,348

(22) Filed: Nov. 14, 2003

(65) Prior Publication Data

US 2005/0108025 A1  May 19, 2005

(51) Int. Cl.
*G06Q 40/00* (2006.01)
(52) U.S. Cl. .............................. 705/38; 705/1
(58) Field of Classification Search ........................ None
See application file for complete search history.

(56) References Cited

U.S. PATENT DOCUMENTS

| | | |
|---|---|---|
| 4,870,576 A | 9/1989 | Tornetta |
| 5,032,989 A | 7/1991 | Tornetta |
| 5,193,056 A | 3/1993 | Boes |
| 5,361,201 A | 11/1994 | Jost et al. |
| 5,414,621 A | 5/1995 | Hough |
| 5,680,305 A | 10/1997 | Apgar, IV |
| 5,754,850 A | 5/1998 | Janssen |
| 5,794,216 A | 8/1998 | Brown |
| 5,852,810 A | 12/1998 | Sotiroff et al. |
| 5,857,174 A * | 1/1999 | Dugan ............................ 705/1 |
| 5,867,155 A | 2/1999 | Williams |
| 6,115,694 A | 9/2000 | Cheetham et al. |
| 6,141,648 A | 10/2000 | Bonissone et al. |
| 6,178,406 B1 | 1/2001 | Cheetham et al. |
| 6,323,885 B1 | 11/2001 | Wiese |
| 6,397,208 B1 | 5/2002 | Lee |
| 6,401,070 B1 | 6/2002 | McManus et al. |
| 6,505,176 B2 | 1/2003 | DeFrancesco, Jr. et al. |
| 6,587,841 B1 | 7/2003 | DeFrancesco et al. |
| 6,609,118 B1 | 8/2003 | Khedkar et al. |
| 6,636,803 B1 | 10/2003 | Hartz, Jr. et al. |
| 6,681,211 B1 | 1/2004 | Gatto |
| 6,748,369 B2 | 6/2004 | Khedkar et al. |

(Continued)

FOREIGN PATENT DOCUMENTS

| | | |
|---|---|---|
| JP | 2001236369 | 8/2001 |
| JP | 2002123589 | 4/2002 |
| KR | 1020010078857 | 8/2001 |
| KR | 1020010105569 | 11/2001 |
| KR | 1020020004710 | 1/2002 |
| KR | 1020050064605 | 6/2005 |

OTHER PUBLICATIONS

"Home Price Analyzer: Online Idex-Based Residential Property Valuations", homepriceanalyzer.com, 2 pages, Oct. 2002.*

(Continued)

*Primary Examiner*—Alexander Kalinowski
*Assistant Examiner*—John D Scarito
(74) *Attorney, Agent, or Firm*—Snell & Wilmer L.L.P.

(57) ABSTRACT

A method of detection of fraud in a mortgage application: in a computer system, maintaining a database of sales prices of real properties in a geographic area where the property is located; obtaining a valuation history for the property; obtaining historical sales data for similar properties in the geographic area; computing price ratios using these valuation histories; computing a distortion index based on the price ratios, the distortion index indicating the likelihood of a fraudulent valuation.

8 Claims, 5 Drawing Sheets

U.S. PATENT DOCUMENTS

| | | | |
|---|---|---|---|
| 6,836,270 B2 | 12/2004 | Du | |
| 6,842,738 B1 | 1/2005 | Bradley et al. | |
| 7,043,501 B2 | 5/2006 | Schiller | |
| 7,054,741 B2 | 5/2006 | Harrison et al. | |
| 7,076,448 B1 | 7/2006 | Snyder | |
| 7,333,943 B1 | 2/2008 | Charuk et al. | |
| 2001/0029477 A1* | 10/2001 | Freeman et al. | 705/36 |
| 2001/0039506 A1 | 11/2001 | Robbins | |
| 2001/0047327 A1 | 11/2001 | Courtney | |
| 2002/0035535 A1 | 3/2002 | Brock, Sr. | |
| 2002/0052766 A1 | 5/2002 | Dingman et al. | |
| 2002/0099650 A1* | 7/2002 | Cole | 705/38 |
| 2002/0103669 A1 | 8/2002 | Sullivan, Sr. et al. | |
| 2002/0133371 A1* | 9/2002 | Cole | 705/1 |
| 2002/0147613 A1 | 10/2002 | Kennard et al. | |
| 2003/0011599 A1 | 1/2003 | Du | |
| 2003/0036995 A1 | 2/2003 | Lazerson | |
| 2003/0036996 A1 | 2/2003 | Lazerson | |
| 2003/0046099 A1 | 3/2003 | Lamont et al. | |
| 2003/0126071 A1 | 7/2003 | Keyes et al. | |
| 2003/0144948 A1 | 7/2003 | Cleary et al. | |
| 2003/0149658 A1 | 8/2003 | Rossbach et al. | |
| 2003/0149659 A1 | 8/2003 | Danaher et al. | |
| 2003/0191723 A1* | 10/2003 | Foretich et al. | 705/400 |
| 2004/0019517 A1 | 1/2004 | Sennott | |
| 2004/0021584 A1 | 2/2004 | Hartz, Jr. et al. | |
| 2004/0039581 A1 | 2/2004 | Wheeler | |
| 2004/0049440 A1 | 3/2004 | Shinoda et al. | |
| 2004/0128232 A1 | 7/2004 | Descloux | |
| 2004/0133493 A1 | 7/2004 | Ford et al. | |
| 2005/0171822 A1 | 8/2005 | Cagan | |
| 2005/0192999 A1 | 9/2005 | Cook et al. | |
| 2005/0216292 A1 | 9/2005 | Ashlock | |
| 2005/0288942 A1 | 12/2005 | Graboske et al. | |
| 2006/0015357 A1 | 1/2006 | Cagan | |
| 2006/0026136 A1 | 2/2006 | Drucker et al. | |
| 2006/0064415 A1 | 3/2006 | Guyon et al. | |
| 2006/0085234 A1 | 4/2006 | Cagan | |
| 2006/0105342 A1 | 5/2006 | Villena et al. | |
| 2006/0122918 A1 | 6/2006 | Graboske et al. | |
| 2006/0200492 A1 | 9/2006 | Villena et al. | |
| 2006/0218003 A1 | 9/2006 | Snyder | |
| 2006/0218005 A1 | 9/2006 | Villena et al. | |
| 2006/0271472 A1 | 11/2006 | Cagan | |
| 2007/0033122 A1 | 2/2007 | Cagan | |
| 2007/0033126 A1 | 2/2007 | Cagan | |
| 2008/0097767 A1 | 4/2008 | Milman et al. | |

OTHER PUBLICATIONS

"Quick Value AVM Services: Instant Online AVMs Make for Rapid Decision Making," www.1sourcedata.com, 1 page, 2003.*
"FNIS Launches New Tool, HQ Score," Real Estate Weekly, Hagedorn Publication, 1 page, Apr. 30, 2003.*
"LSI Indicator, asn LSI Collateral Assessment Solution," LenderService.com, 2 pages, data unknown.*
"Median Price By Zip Code By Month For May 2004," DataQuick Information Systems, *Los Angeles Times*, 6 pages, Jun. 2004.
"GIS for Real Estate," www.esri.com, 1 page, Feb. 15, 2007.
"Using GIS for Real Estate Market Analysis: The Problem of Spatially Aggregated Data," John Clapp, Journal of Real Estate Research, 9 pages, 1998.
"What's Your Home Worth," www.homevaluecma.com, 2 pages, Feb. 15, 2007.
"Accurate Home Valuations . . . in Seconds!" *Veros Corp.*, 1 page, date unknown.
"Automated Valuation Models (AVM)," *Informative Research Corp.*, 1 page, date unknown.
"FNIS Launches QuadMerge™ Value," TitleWeb.com, 2 pages, date unknown.
"Home Value Explorer®," *Freddie Mac Corp.*, 1 page, date unknown.
"Freddie Mac's Home Value Explorer, VeroValue," *Determination Processing Services*, Inc., 3 pages, date unknown.
"Identifying & Managing Technology Risks, Automated Valuation Models," Lewis J. Allen, 36 pages, date unknown.
"LSI Indicator, an LSI Collateral Assessment Solutions," LendersService.com, 2 pages, date unknown.
"Mitigating Portfolio Risk During a Flat Market," Gregory F. Hansen, 2 pages, date unkown.
"QuadMerge™ & QuadMerge Value™ Quick Reference Guide," *FNIS Corp.*, 1 page, date unknown.
"Veros™ Software," verso.com, 31 pages, date unknown.
"AVM Debate Tilts in Favor: The mortgage lending industry may finally be ready embrace technology to automated the valuation function (Technology Information)," Mary Dunn, *Mortgage Technology*, 5 pages, Jul. 2001.
"Collateral Score Pat 1-Scoring Applications in Residential Mortgage Lending: A Survey of Issues," Nima Nattagh, et al. FNC White Paper, 8 pages, Feb. 2002.
"Home Price Analyzer: Online Index-Based Residential Property Valuations," homepriceanalyzer.com, 2 pages, Oct. 2002.
"FNIS Launches New Tool, HQ Score," *Real Estate Weekly*, Hagedorn Publication, 1 page, Apr. 30, 2003.
"FNIS Hansen QRS: Product Overview," www.FNIS.com, 1 page, 2003.
"Forecasting Valuation Risk for Real Estate and Other Industries," Eric P. Fox, *Veros Software*, 14 pages, Jun. 17, 2003.
"PASS Valuation Model," Basis 100 Corp., 1 page, Jul./Aug. 2003.
"Freddie Mac's Home Value Explorer®," Freddie Mac, 1 page, Nov. 2003.
"Freddie Mac's Home Value Explorer®, Product Enhancement Summary Forecast Standard Deviation (FSD)," Freddie Mac, 2 pages, Apr. 4, 2004.
MBA's First Fraud Awareness Seminar: "Detecting Fraud in the Mortgage Process", Mortgage Bankers Association of America, Aug. 15, 2000.
Freddie Fights Fraud with Technology Score Helps Identify Inflated Property Values, Mortgage Bankers Association of America, Mar. 15, 2002.
Fraud on the Rise Advantage Credit Finds 23% of Brokers Surveyed Received Fraudulent Loan Applications, Inman News Features, Sep. 17, 2002.
City in Flames Atlanta Fraud Network Responsible for More than $100 Million in Losses, Sam Garcia, MortageDaily.com, Nov. 14, 2002.
Fraud Flips National Phenomenon A Look at Mortgage Fraud Schemes, Christy Robinson, MortgageDaily.com, Dec. 9, 2002.
Pre Funding and your Business!, Lisa Binkley and Penny Paplanus, Jan. 31-Aug. 1, 2003.
Keller, Paul & Pyzdek, Thomas. Six Sigma Demystified. McGraw-Hill Professional. 2004. pp. 3-4, 100-102, 147-148 and 291-292.
Meyer. Philip. Precision Journalism. Rowman & Littlefield Publishers. 2002. pp. 39-41.

* cited by examiner

SUBJECT PROPERTY TEMPORAL PRICE MATRIX

| YEAR | Subject | SOURCE |
|---|---|---|
| 1994 | $ 180,000 | prior sale |
| 1995 | | |
| 1996 | | |
| 1997 | | |
| 1998 | | |
| 1999 | $ 268,000 | VP4 AVM July 1 |
| 2000 | $ 276,000 | VP4 AVM July 1 |
| 2001 | $ 335,000 | VP4 AVM July 1 |
| 2002 | $ 371,000 | VP4 AVM July 1 |
| 2003 | $ 395,000 | VP4 AVM July 1 |
| 2003 | $ 550,000 | FRAUD July 1 |

SPATIAL PRICE MATRIX

| ZIP CODE | Los Angeles POSTAL CITY | L.A. COUNTY |
|---|---|---|
| $175,000 | $ 150,000 | $ 160,000 |
| $167,000 | $ 139,000 | $ 153,000 |
| $163,000 | $ 134,500 | $ 150,000 |
| $178,000 | $ 136,000 | $ 150,000 |
| $195,000 | $ 138,000 | $ 162,000 |
| $244,000 | $ 142,000 | $ 175,000 |
| $261,000 | $ 149,000 | $ 192,000 |
| $310,000 | $ 170,000 | $ 229,000 |
| $388,000 | $ 220,000 | $ 267,000 |
| $410,000 | $ 241,000 | $ 297,000 |
| $410,000 | $ 241,000 | $ 297,000 |
| (Apr-Jun) | | (Apr-Jun) |

MATRIX OF SPATIAL VARIANCES

| YEAR | Subject to zip | Subject to city | Subject to county | Zip to city | Zip to county | City to county |
|---|---|---|---|---|---|---|
| 1994 | 103% | 120% | 112% | 117% | 109% | 94% |
| 1995 | | | | 120% | 109% | 91% |
| 1996 | | | | 121% | 109% | 90% |
| 1997 | | | | 131% | 119% | 91% |
| 1998 | | | | 141% | 120% | 85% |
| 1999 | 110% | 189% | 153% | 172% | 139% | 81% |
| 2000 | 106% | 185% | 144% | 175% | 136% | 78% |
| 2001 | 108% | 197% | 146% | 182% | 135% | 74% |
| 2002 | 96% | 169% | 139% | 176% | 145% | 82% |
| 2003 | 96% | 164% | 133% | 170% | 138% | 81% |
| 2003 | 134% | 228% | 185% | 170% | 138% | 81% |

MATRIX OF TEMPORAL VARIANCES
CHANGE FROM PRIOR YEAR

| YEAR | Subject | ZIP | CITY | COUNTY |
|---|---|---|---|---|
| 1994 | | -8% | -4% | -6% |
| 1995 | | -5% | -7% | -4% |
| 1996 | | -2% | -3% | -2% |
| 1997 | | 9% | 1% | 0% |
| 1998 | | 10% | 1% | 8% |
| 1999 | | 25% | 3% | 8% |
| 2000 | | 7% | 5% | 10% |
| 2001 | 21% | 19% | 14% | 19% |
| 2002 | 11% | 25% | 29% | 17% |
| 2003 | 6% | 6% | 10% | 11% |
| 2003 | 48% | 6% | 10% | 11% |

*Fig. 5*

METHOD FOR MORTGAGE FRAUD DETECTION

BACKGROUND OF THE INVENTION

1. Field of the Invention

The present invention relates to a method of detecting fraud in loan application. More particularly, the present invention relates to a method of estimating the risk associated with a contemplated loan, and especially to estimating the risk that a lender may be induced to rely on an unrealistically high estimate of the value of the real property that is to secure the loan.

2. Description of the Related Art

For the purpose of controlling the risk associated with lending money secured by real property, a loan originator attempts to estimate the value of the property being used to secure the note. Traditionally, the originator paid an appraiser, who was supposed to be knowledgeable in the type of real property in question and skilled in comparing such properties, and relied on the appraiser's estimate of the market value of the real property in order to limit the risk that value would be inadequate to secure the note. The use of appraisals continues. In recent years, lenders who wish to rely less on the appraisal have begun using "automated valuation models" ("AVMs"), methods of estimating the market value of a property based on various methodologies such as price indexing methods, hedonic models, adjusted tax assessed value models, and hybrid models.

A lender may also inquire whether the property has undergone certain patterns of frequent sales, loans or refinancings which have, in that lender's experience, come to be associated with attempts to cause artificially high estimates of the value of the property. Additionally, the lender may investigate the creditworthiness of the person applying for the loan. Finally, the lender might seek out information about the applicant's history, taking a particular interest in whether the applicant has been involved in a cluster of activities involving real property in the neighborhood.

Thus, existing methods for fraud detection tend to emphasize either or both of (1) the history of the subject property (the property proposed for a sale or loan), with a special view to any possible "flipping" (rapid series of sales, loans, or refinances), and (2) the history and creditworthiness of the applicant, with a special view to any other transactions in the neighborhood of the subject property.

These methods are not infallible. An appraiser charges a hefty fee, usually requires several days or more to deliver an appraisal, and occasionally turns out to be incompetent, gullible, or corrupt. Persons attempting to inflate the estimated value of a property have been known to engage in patterns of sham sales of the subject property or of nearby properties. They may also act in concert with others to create in the mind of a purchaser or a lender a false impression that properties in the area are appreciating rapidly. Such tactics might also have the effect of feeding artificially inflated values to the automated valuation models that the lender is relying on.

An inexperienced or careless loan officer may be taken in by such schemes. Unfortunately, even a more wary loan officer may hesitate to deny the application or to demand additional information. Lenders are under pressure to avoid the appearance that they are engaging in unfair discrimination against classes of applicants or against neighborhoods which are perceived to be underserved by the banking industry. The lender may fear being sued and being forced at great expense to prove an objective basis for denying an application.

It is therefore necessary for lenders to have more efficient, reliable, objective means of controlling the risk of being victimized by mortgage fraud.

SUMMARY OF THE INVENTION

It is an object of the present invention to improve a lender's ability to control the risks associated with mortgage fraud while also controlling the costs of avoiding those risks.

In accordance with these objects and with others which will be described and which will become apparent, an exemplary embodiment of a method for mortgage fraud prevention in accordance with the present invention comprises the steps of maintaining a database of sales prices in the computer system of a plurality of real properties in a geographic area in which the subject real property is located; obtaining from the computer system, valuation history data for the subject property; obtaining, using the computer system, historical sales data for property in the geographic area in which the subject real property is located; computing price ratio data using the valuation history for the subject property and the historical sales data for the subject property in the geographic area in which the subject property is located, and computing a distortion index based on the price ratio data to detect fraud in the mortgage application.

The distortion index may include a temporal distortion index, a spatial distortion index, or a combination of these.

The matrices of data that are assembled in the process of preparing the distortion index may also be reported.

The method may be applied prospectively or retrospectively, with single properties or with large numbers of properties, and with the aid of varying audomated valuation models.

The method may be applied by a person far removed in time and place from the transaction in question and having no particular connection to it. Because a person using the method does not need to single out any neighborhood or other geographical area as a special danger area for fraud, the method in accordance with the present invention helps reduce the danger that a lender would be accused of improper exclusion, such as redlining.

BRIEF DESCRIPTION OF THE DRAWINGS

For a further understanding of the objects and advantages of the present invention, reference should be had to the following detailed description, taken in conjunction with the accompanying drawing, in which like parts are given like reference numbers and wherein.

DETAILED DESCRIPTION OF THE INVENTION

Figure 1:
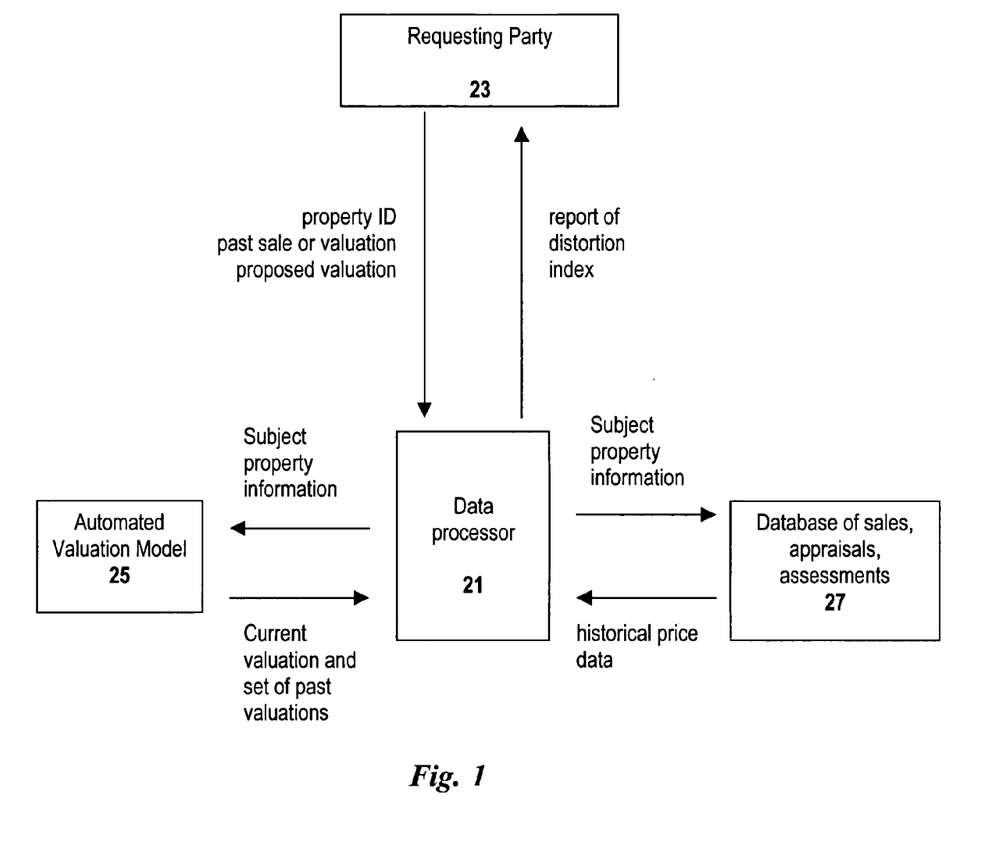
FIG. 1 is a block diagram of the overall process and information flow for an exemplary method of detecting mortgage fraud in accordance with the present invention.

With reference to FIG. 1, an exemplary embodiment of the method of detecting mortgage fraud in accordance with the present invention utilizes a general purpose computer with access to a database of sales price information pertaining to a geographical area where a parcel of real property is situated. The method obtains the identification of the subject property. The data processor 21 obtains from the requesting party 23 the location and characteristics of the property along with the proposed valuation of the property. The property characteristics and location are used to formulate a query to a database 27 of historical median price data for the zip code, city, and county in which the property is situated. The city may be the "postal city," which is the default United States Postal Service city name for the subject property's zip code. Alternatively, the city may be the situs city, which includes the literal bounds of the city. The results of the query are used to create a matrix of spatial price information. From the requesting party 23 or from the database 27, the data processor 21 also obtains the time and price of a prior sale or valuation of the subject property. The data processor 21 passes this information to the automated valuation model 25, which returns a set of yearly price values for the subject property. The data processor 21 then computes a spatial distortion index, a temporal distortion index, and a total distortion index. Finally, the data processor 21 reports at least the total distortion index to the requesting party.

The exemplary embodiment of the method of detecting mortgage fraud in accordance with the present invention utilizes a general purpose computer with access to a database of sales price information pertaining to a geographical area where a parcel of real property is situated.

The method in accordance with the present invention places the subject property and its requested or alleged value for purpose of sale, loan, or refinance, within both a spatial and a temporal context.

The method constructs a temporal context or "valuation history" for the subject property. This context is both real and virtual. It is real in that it includes all known valuations attributed to prior sales, appraisals, and refinances of the property. It is virtual in that it includes valuations of the property, done by an automated valuation model (AVM), valuing the property at regular intervals, such as yearly, back into the past.

The method also constructs a spatial context for the subject property at several geographic levels, obtaining median sale prices for the property's zip code, city, and county from a high-quality database, the data for which is usually obtained from the county recorder's office. The database is queried for data pertinent to properties sharing the characteristics of the subject property. For example, if the subject property is a single family residence, the database is queried for single family residences. If the property is a condominium or townhouse and appropriately specific data are available, the query will reflect this information. These prices are extracted for the present and the past, for the time periods used in building the temporal context.

In accordance with the present invention, the temporal and spatial contexts together build a price level matrix. One column of the matrix constitutes the prices of the subject property's temporal context. The other columns of the matrix are built from the prices of the various levels of the spatial context.

From the price level matrix it is possible to construct a price ratio matrix. The rows of this matrix are assigned to the time periods of the temporal context; the columns represent the concentric levels of the spatial context. The entries in the matrix represent the ratios of price levels (for the different time periods) of subject property to zip code prices, subject property to city prices, subject property to county prices, zip code to city, and city to county.

Ratios outside of reasonable contextual levels are said to be distorted. In the price ratio matrix, reasonable variations are possible in the absence of fraud. Individual properties can be more or less valuable than the main body of properties in their zip code, city, or county. Prices in a zip code or city can be higher or lower than those in their corresponding city or county. The ratios can also vary according to basic principles of the business cycle. For instance, it is generally accepted that during boom times prices in affluent areas rise in greater proportions than do prices in middle-class or poor areas, whereas during declining markets, prices in affluent areas are subject to disproportionate declines. Furthermore, price trends in affluent areas tend to "lead" the rest of the market in that they pull out of a recession, or stop rising near the end of a boom, before the main body of the market does so.

Abnormal or distorted ratios may suggest the possibility of fraud in a loan application, and indicate the wisdom of further investigation such as an outside appraisal. If the past history of a subject property suggests that its valuation is between 100% and 120% of the median value in its zip code, but the last two loans on the property were based on valuations which were first 180% and then 250% of the median value in the zip code, this spatial ratio distortion may suggest the possibility of fraud. In the same way, if prices in the property's zip code have been rising at 5% to 7% per year for the past few years, but the alleged valuations of the subject property represent an increase of 40% over the previous year's valuation, this temporal ratio distortion may suggest the possibility of fraud.

The individual temporal ratio distortions and spatial ratio distortions can be used to construct a distortion ratio score which may be expressed in numerical or letter-grade form to suggest the presence of unusual numbers and the possibility of fraud.

With reference to FIGS. 2-5, an example of the method of detecting mortgage fraud in accordance with the present invention utilizes a general purpose computer with access to a database of sales price information pertaining to a geographical area where a parcel of real property is situated.

Figure 2:
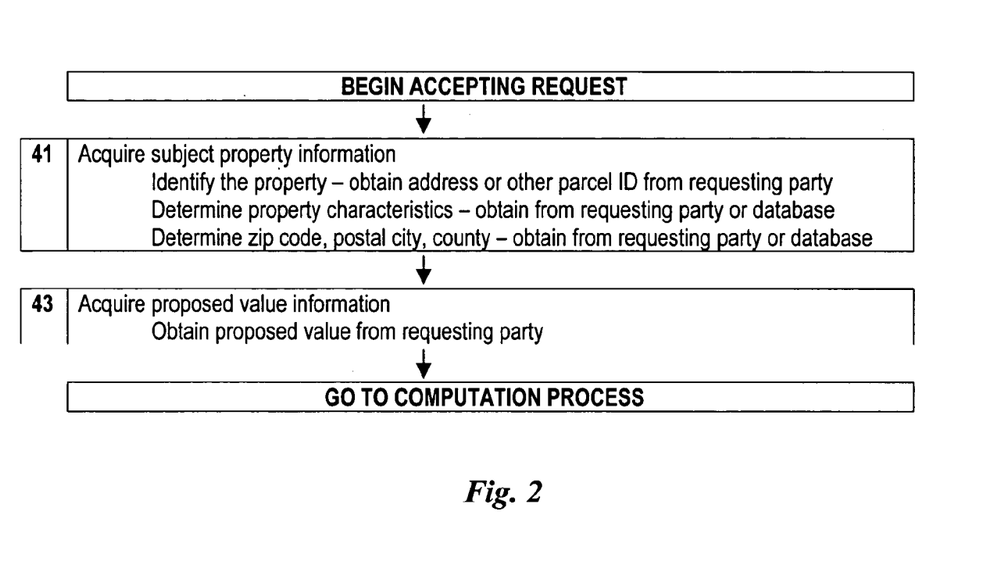
FIG. 2 is a block diagram of input steps for an example of the method of detecting mortgage fraud in accordance with the present invention.

With particular reference to FIG. 2, the process begins when information is obtained as shown at reference number 41 about the subject property including its address, the identity of its owner, and physical attributes such as the type of structure, square footage, lot size, and the like. Also obtained (see at 43) is the valuation that is being requested or proposed by the applicant. The process will now be described by way of example as of a time-point of Jul. 1, 2003 for two proposed market values: a realistic value and an unrealistically high value. In this example, it will be assumed that for the property involved, a value of $400,000 is reasonable and $550,000 is unrealistically high.

At this point, the proposed value and the time of the proposed value may be tabulated for the two alternative values as follows:

| TIME | PRICE | COMMENT |
| --- | --- | --- |
| Jul. 1, 2003 | $400,000 | realistic requested value |
| Jul. 1, 2003 | $550,000 | unrealistic requested value |

Figure 3:
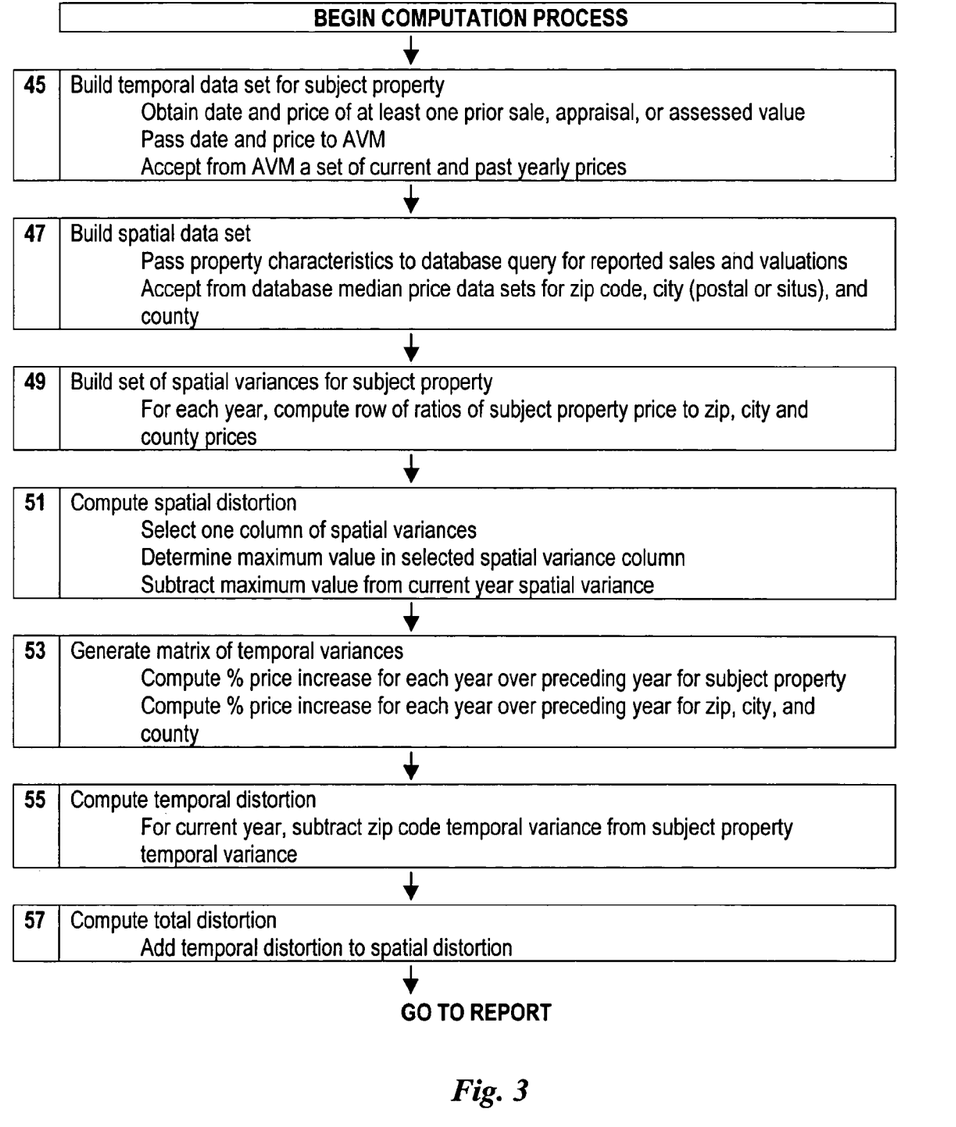
FIG. 3 is a block diagram of computation steps for an example of the method of detecting mortgage fraud in accordance with the present invention.

With reference to FIG. 3, at 45, the process next obtains data about previous sales, appraisals, or refinance valuations for the subject property, along with date and source of those valuations. In this example, the subject property was sold in 1994 for $180,000. This prior sale may be represented as follows:

| TIME | PRICE | COMMENT |
| --- | --- | --- |
| 1994 | $180,000 | prior sale |

The process next calls upon an automated valuation model to produce a valuation of the subject property as of the date of the request and at one-year intervals into the past to the extent permitted by the available data. In this example, the automated valuation model being used is ValuePoint®4 ("VP4"), a well-known service provided by First American Real Estate Solutions. It can be seen that the VP4 automated valuation model has generated a series of estimated price values for the subject property for Jul. 1, 1999 ($268,000) through Jul. 1, 2003 ($395,000). These data, which we may refer to as temporal information concerning the subject property, may be tabulated as follows:

| TIME | PRICE | COMMENT |
| --- | --- | --- |
| 1994 | $180,000 | prior sale |
| 1995 | | |
| 1996 | | |
| 1997 | | |
| 1998 | | |
| 1999 | $268,000 | automated value -- VP4 AVM for July 1 |
| 2000 | $276,000 | automated value -- VP4 AVM for July 1 |
| 2001 | $335,000 | automated value -- VP4 AVM for July 1 |
| 2002 | $371,000 | automated value -- VP4 AVM for July 1 |
| 2003 | $395,000 | automated value -- VP4 AVM for July 1 |
| 2003 | $400,000 | Requested July 1 - realistic |
| 2003 | $550,000 | Requested July 1 -- unrealistic |

At 47, the process next builds one or more columns of information about the economic performance of other properties having various spatial relationships to the subject property. In this example, the process builds columns of median price data for properties having characteristics similar to those of the subject property. For example, median price data are obtained for properties of the same type as the subject property, such as "single-family residence" or "condominium/townhouse." Further refinements based on studying detailed property characteristics are also possible. These data are obtained or computed from a database of available reported sales, appraisals, and the like in the same zip code, postal city, and county as the subject property. The postal city is the default city name as used by the United States Postal Service for the zip code in which the property is situated. Alternatively, the situs city of the subject property could be used: the city inside whose borders the subject property is legally situated.

These median price statistics are to come from a standard and reliable source. These numbers must apply to the same type of residential property as the subject property (single-family residence, or condo/townhouse, etc.). These numbers are for time periods to correspond with the months and years that appear in the subject property columns. For dates in the most recent year, the process uses tri-monthly medians for the most recent completed three months. For dates in previous years, the process uses yearly medians.

The process unites the information into a spatial price median matrix, which may be tabulated as follows:

| TIME | PRICE OF SUBJECT PROPERTY | PRICE OF PROPERTIES IN SAME ZIP CODE | PRICE OF PROPERTIES IN SAME POSTAL CITY | PRICE OF PROPERTIES IN SAME COUNTY |
| --- | --- | --- | --- | --- |
| 1994 | $180,000 | $175,000 | $150,000 | $160,000 |
| 1995 | | $167,000 | $139,000 | $153,000 |
| 1996 | | $163,000 | $134,500 | $150,000 |
| 1997 | | $178,000 | $136,000 | $150,000 |
| 1998 | | $195,000 | $138,000 | $162,000 |
| 1999 | $268,000 | $244,000 | $142,000 | $175,000 |
| 2000 | $276,000 | $261,000 | $149,000 | $192,000 |
| 2001 | $335,000 | $310,000 | $170,000 | $229,000 |
| 2002 | $371,000 | $388,000 | $220,000 | $267,000 |
| 2003 | $395,000 | $410,000 | $241,000 | $297,000 |
| 2003 | $400,000 (proposed) | | | |
| 2003 | $550,000 (proposed) | | | |

At 49, for each time value (each year), the process computes ratios of the subject property value (price) to the median value reported in the various reference data sets (here, the reference data sets are the median price data for the same zip code, same postal city, and same county as the subject property). The result, which may be referred to as a matrix of spatial variances, may be tabulated as follows:

| TIME | RATIO, %, SUBJECT TO ZIP | RATIO, %, SUBJECT TO CITY | RATIO, %, SUBJECT TO COUNTY | RATIO, %, ZIP TO CITY | RATIO, %, ZIP TO COUNTY | RATIO, %, CITY TO COUNTY |
|---|---|---|---|---|---|---|
| 1994 | 103 | 120 | 112 | 117 | 109 | 94 |
| 1995 |  |  |  | 120 | 109 | 91 |
| 1996 |  |  |  |  |  | 90 |
| 1997 |  |  |  |  |  | 91 |
| 1998 |  |  |  |  |  | 85 |
| 1999 | 110 | 189 | 153 | 172 | 139 | 81 |
| 2000 | 106 | 185 | 144 | 175 | 136 | 78 |
| 2001 | 108 | 197 | 146 | 182 | 135 | 74 |
| 2002 | 96 | 169 | 139 | 176 | 145 | 82 |
| 2003 | 96 | 164 | 133 | 170 | 138 | 81 |
| 2003* | 98 | 166 | 133 | 170 | 138 | 81 |
| 2003** | 134 | 228 | 185 | 170 | 138 | 81 |

*proposed realistic value
**proposed unrealistic value

From this table, it is evident that the historical value and the automated valuation of the subject property are typical of the values of similar properties in the zip code. It also appears that such properties in the subject property's zip code are more expensive than those in the city or county as a whole, and have risen faster in recent years than those in the city or county as a whole.

It also is evident that the ratios computed from the unrealistic valuation (134%, 228%, 185%) stand out somewhat from the rest of the matrix. The unrealistic valuation is apparent when measured arithmetically by subtraction. For example, by way of subtraction, 134% is 24% higher than 110%, the maximum ratio found in the column above it. Similarly, 228% is 31% higher than 197%, the maximum ratio in the column above it, and 185% is 32% higher than 153%, the maximum ratio in the column above it.

Alternatively, the ratios may be measured arithmetically by division. For example, a comparison by way of division of the realistic and unrealistic value ratios of the subject property divided by their respective maximum prior ratios are as follows:

| Realistic | Unrealistic |
|---|---|
| 98%/110% = 89% | 134%/110% = 122% |
| 166%/197% = 84% | 228%/197% = 116% |
| 133%/153% = 87% | 185%/153% = 121% |

For purposes of the present example, however, this alternative measurement of ratios by division will not be used in the subsequent steps of the process.

At 53, the process generates a matrix of temporal variances by computing the following ratios for each time period:

Subject value to subject value one year prior;
Zip code median to zip code median one year prior;
City median to city median one year prior;
County median to county median one year prior.

"One year prior" in this example means the complete year previous to the year in question. The temporal variances are tabulated as follows:

| time | ratio, %, subject, over year previous | ratio, %, zip, over year previous | ratio, %, city, over year previous | ratio, %, county, over year previous |
|---|---|---|---|---|
| 1994 |  | −8 | −4 | −6 |
| 1995 |  | −5 | −7 | −4 |
| 1996 |  | −2 | −3 | −2 |
| 1997 |  | 9 | 1 | 0 |
| 1998 |  | 10 | 1 | 8 |
| 1999 |  | 25 | 3 | 8 |
| 2000 |  | 7 | 5 | 10 |
| 2001 | 21 | 19 | 14 | 19 |
| 2002 | 11 | 25 | 29 | 17 |
| 2003 | 6 | 6 | 10 | 11 |
| 2003* | 8 | 6 | 10 | 11 |
| 2003** | 48 | 6 | 10 | 11 |

*proposed realistic value
**proposed unrealistic value

It is noticeable that the temporal variance associated with the unrealistic valuation (48%) stands out as inconsistent with the rest of the matrix, while the temporal variance associated with the realistic valuation (8%) does not.

At 51, the process identifies distortions that are associated with the subject property valuation. The spatial distortion is the amount that the subject to zip ratio exceeds the maximum of the entries in the column above it. For the realistic valuation of $400,000, that distortion is zero, since 98% does not exceed 110%. For the unrealistic valuation of $550,000, that distortion is 24%, since 134%−110%=24%.

In some zip codes, there might not be enough data on historical prices of comparable properties to produce a reliable matrix. In such a situation, where, for example, the average number of sales in a zip code per year is less than 100, the process may use the subject to city ratio or the subject to county ratio in place of the subject to zip ratio.

At 55, the process computes a temporal distortion, which is defined as the percentage change in subject valuation from the prior year, minus the percentage change in the zip code valuation from the prior year. For the realistic valuation, the temporal distortion is 8%−6%=2%. For the unrealistic valuation, the temporal distortion is 48%−6%=42%. As before, if the average number of sales in a zip code per year is less than 100, the process may use the subject to city ratio or the subject to county ratio in place of the subject to zip ratio.

It should be pointed out that an alternative index of temporal distortion is computable as the ratio of the percentage change in subject valuation from the prior year to the percentage change in the zip code valuation from the prior year. For the purposes of the present example, however, this alternative distortion index will not be used in the subsequent steps of the process.

At 57, the process computes the total distortion, which is defined as the sum of the spatial and temporal distortions. For the legitimate valuation, the total distortion is 0%+2%=2%. For the fraudulent valuation, it is 24%+42%=66%.

Figure 4:
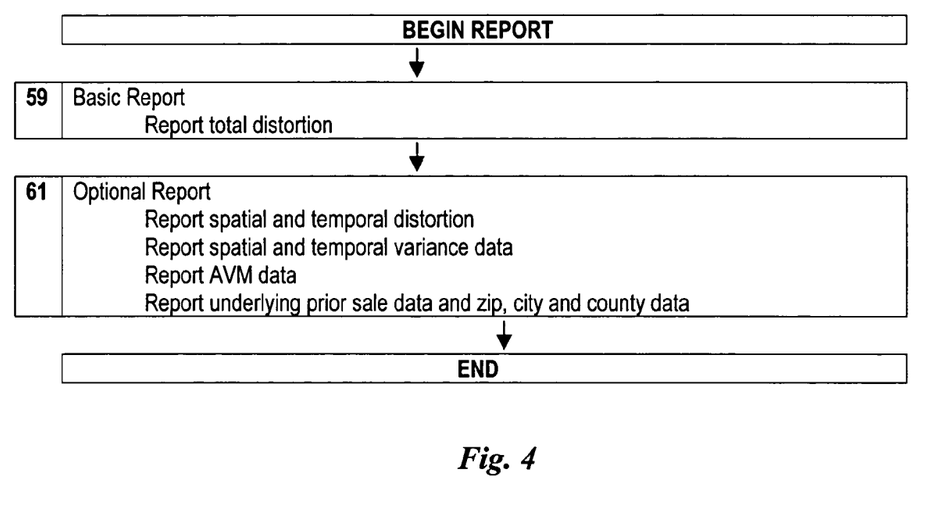
FIG. 4 is a block diagram of report steps for an example of the method of detecting mortgage fraud in accordance with the present invention.
Figure 5:
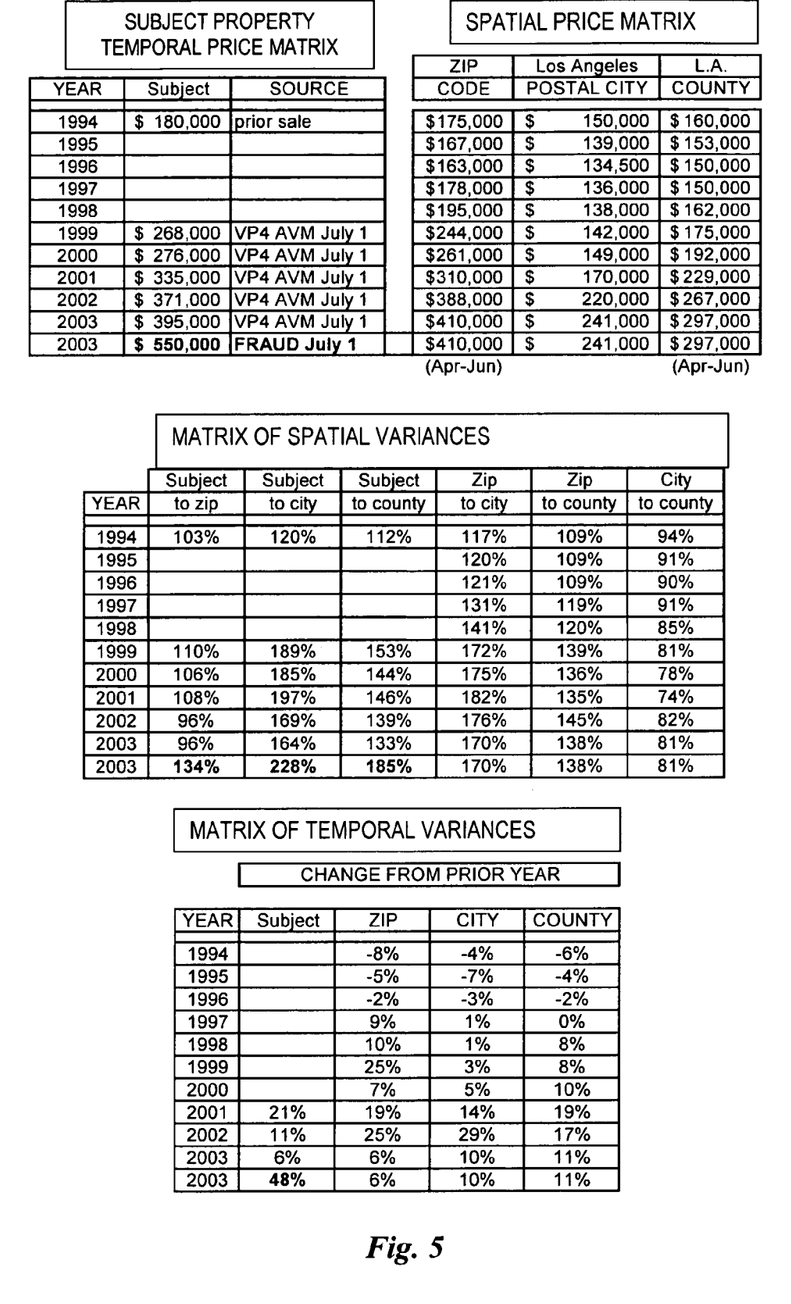
FIG. 5 is an exemplary set of matrices of data reported in accordance with the present invention.

With reference to FIG. 4, at 59, the process reports this total distortion to the customer. Optionally, at 61, the reported information also includes the spatial and temporal components individually and, if it is deemed appropriate, some or all of the matrix data that gave rise to the computation as shown in FIG. 5.

A total distortion above 50% usually suggests an unrealistic valuation and hence a possible fraud. A total distortion above 100% almost always merits further investigation.

Optionally, the process allows the customer to specify any desired total distortion value which would flag an application as likely to be fraudulent.

If the customer or user requests it, the price, ratio, and distortion matrices can be offered as supporting documentation. If no fraud is suspected, this step will usually not be necessary. If a fraud is suspected, this supporting documentation can be very useful to support and guide any lending or other decision. It is a particular advantage of the present invention that it avoids the inference of redlining or other geographic discrimination, because the person using the method does not need to single out any neighborhood or other geographical area as a special danger area for fraud and because the data produced in accordance with the present invention is "mechanistic" rather than subjective or personal.

FIG. 5 exemplifies documentation the present invention makes available where a valuation is suspected to be fraudulent. Such information can be delivered efficiently to the customer along with other information such as the proposed valuation and the name address of the applicant and the address and relevant information concerning the subject property.

Many lenders will be satisfied with such a score or grade, especially if the findings suggest normal price levels and thus a low likelihood of fraud. In some cases, lenders will request the supporting documentation of the price level matrix and price ratio matrix, especially in cases where a high distortion ratio score suggests the possibility of fraud.

The requirements of the method in accordance with the present invention are not the same as the requirements of existing fraud detection methods. The requirements are twofold: (1) the availability of a high quality automated valuation model (AVM) which is able to value a subject property in current time and at selected times in the past; and (2) a database of median price statistics at several geographic levels such as the zip code, city, and county where the subject property is situated. It is a significant advance to recognize how these methods can be combined and to devise an effective way of combining them to detect mortgage fraud with improved accuracy and efficiency. The method in accordance with the present invention astutely combines these two components to provide a number of advantages over existing fraud detection methods. For example, the method in accordance with the present invention can provide documentation if a lender is called upon to support a decision on a loan application. The efficiency of automated data processing reduces the cost of producing such documentation when it is called for.

The scores and matrices produced by the method in accordance with the present invention can be requested and transmitted in an automated fashion for one property at a time or for thousands or millions of properties. The method can be used whenever needed, for subject properties and applications throughout the country. Thus, the method can achieve economies of scale.

An entire bundle of loans may be analyzed pursuant to one request. The loans may be proposed loans, or they may be loans that were made in the past. Thus, the fraud sought to be detected may be prospective, or it may already have occurred. One may, therefore, use the present invention to re-evaluate the risk entailed in choices that were made in the past or that were made by others who, at the time, had a very different appreciation of the sensitivity and selectivity with which others later would evaluate the risk of fraud.

The method in accordance with the present invention also embodies a recognition of the tactics and limitations of the perpetrators of mortgage fraud, with a view to making fraud much more difficult to accomplish and rendering fraudulent alleged values easier to detect. For example, perpetrators of fraud ("fraudsters") are frequently able to arrange a series of real or alleged sales, appraisals, or loans for a subject property, often at ascending valuation levels, to support their claims of value for a sale or loan. Fraudsters also often arrange a series of real or alleged sales, appraisals, or loans for a set of properties in a single neighborhood, often at ascending valuation levels, to support their claims of ascending market valuations or prices, and to support their alleged valuation of a subject property for the purposes of a sale or loan.

However, fraudsters will not have the resources to arrange enough false valuations or false sale prices to distort the overall price levels in a well-populated zip code, much less in an entire city or county, because there are many legitimate sales in such areas. Fraudsters also probably will not have the persistence to arrange a history of false valuations or prices on a subject property that extends several years into the past. In general, fraudsters are unlikely to spend three, five, or more years to build a trail of false valuations of a subject property. Combining a spatial distortion index with a temporal distortion index places the concealment of the attempted fraud beyond the resources and beyond the patience of fraudsters.

Thus, an advantage of the method in accordance with the present invention is that it uses a combination of distortion ratio methods to differentiate realistic valuations, which are likely to result from underlying market phenomena, from various types of unrealistic valuations that are likely to result from the behaviors that fit the methods and motivations of fraudsters. The various advantages of the method combine to result in a substantial, novel, non-obvious advance over existing methods of detecting fraud in a mortgage application.

The method in accordance with the present invention is also useful in identifying past transactions which gave rise to anomalous valuations. For example, one may wish to investigate the history of a particular property not only for indications of mortgage fraud, but also for indications that any party to a transaction recognized a value inconsistent with market conditions.

For this purpose, a database of valuation-generating events is maintained in a computer system for a plurality of real properties in a geographic area in which the subject real property is located. A valuation-generating event may be a sale, a valuation pursuant to a mortgage application, or any other event indicating a value placed on the property by any party. A subject property record set including a price (or other valuation) of the property and the date thereof for at least one valuation-generating event is obtained from the computer. A valuation history data set for the subject property, comprising prices and the dates thereof for several timepoints, is obtained from the computer. This step may involve obtaining values generated by automated valuation models as well as values derived from other sources of data. Finally, historical sales data for property in the geographic area in which the subject real property is located is obtained from the computer. This data is obtainable, for example, from county recorders. To obtain suitable data, a database query may be formulated comprising such information as the location, type, and other economically important characteristics of the subject property, to the extent appropriate in light of the available data.

In the manner described herein, price ratio data is computed using the valuation history for the subject property and the historical sales data for the subject property in the geographic area in which the subject property is located. Also in the manner described herein, a distortion index is computed based on the price ratio data to detect an anomalous valuation in the at least one valuation generating event.

However, instead of computing and reporting a distortion index for a single property for the purpose of detecting fraud in a pending mortgage application, a distortion index is computed and displayed for each of a plurality of conditions so that patterns and relationships may be revealed. For example, for a single identified property the distortion index may be reported as a function of time. Alternatively, a particular timeframe may be selected and the distortion index may be reported as a function of other variables or combinations of variables. The variables may include, for example, the identity of the transferor or the transferee, the identity of the lender or loan officer, the geographical location, the municipal jurisdiction, or any other descriptive information associated with the property or with the transaction. It is possible, therefore, to associate certain individuals, brokers, lenders, environments or timeframes with certain valuation patterns that signal an anomalous valuation.

Thus, the method in accordance with the present invention becomes a potent tool for risk management in secondary sales of financial instruments, as well as for historical and economic research and other investigative purposes.

It will be appreciated that many variations are possible for practicing the invention without departing from the spirit of the present invention, whose scope is to be limited only by the claims appended to this specification.

What is claimed is:

1. A method of detecting fraud during a real estate transaction, the method comprising:
   using a computer data processor to:
      access a database of real property prices in a geographic area in which a subject real property is located;
      using data from the database or data from a requestor to generate a temporal data set comprising a current yearly real property price for the subject real property and a set of past yearly real property prices for the subject real property;
      generate from the database a spatial data set comprising a current yearly real property price for real property with similar characteristics as the subject real property and a set of past yearly real property prices for real property with similar characteristics as the subject real property;
      generate a set of temporal variances;
      generate a set of spatial variances;
      compute a spatial distortion based on the set of spatial variances;
      compute a temporal distortion based on the set of temporal variances;
      compute a total distortion by adding the temporal distortion to the spatial distortion; and
      produce a distortion ratio score to indicate a likelihood of fraud based on the total distortion.

2. The method of claim 1, wherein the temporal data set is generated by using sales data for the subject real property.

3. The method of claim 1, wherein the temporal data set is generated by using an automated valuation model.

4. The method of claim 1, wherein the temporal data set is generated by using a combination of sales history data for the subject real property and an automated valuation model applied to the subject real property.

5. The method of claim 1, wherein the spatial variances comprise real property prices selected from a group consisting of real property prices from a same zip code as the subject real property, real property prices from a same postal city as the subject real property, and real property prices from a same county as the subject real property.

6. A method of detecting fraud during a real estate transaction, the method comprising:
   using a computer data processor to:
      access a database of real estate prices in a geographic area in which a subject real property is located;
      generate from the database a real estate price data set selected from a group consisting of real estate prices in a same zip code as the subject real property, real estate prices in a same city situs code as the subject real property, and real estate prices in a same county as the subject real property;
      generate a spatial variance by computing at least two years of ratios, the ratios, corresponding to the selected real estate price data set selected from a group consisting of subject real property prices to the real estate prices in the same zip code from the real estate price data set, the subject real property prices to the real estate prices in the same city situs from the real estate price data set, and the subject real property prices to the real estate prices in the same county from the real estate price data set;
      compute a spatial distortion by determining a maximum value in the spatial variance and subtracting the maximum value from the current year spatial variance; and
      produce a distortion ratio score to indicate a likelihood of fraud based on the spatial distortion.

7. A system for detecting fraud during a real estate transaction, comprising:
   a computer processor; and
   a memory storing program instructions, said program instructions when executed by the computer processor causes the computer processor to:
      access a database of real estate prices in a geographic area in which a subject real property is located;
      generate from the database a real estate price data set selected from a group consisting of real estate prices in a same zip code as the subject real property, real estate prices in a same city situs as the subject real property, and real estate prices in a same county as the subject real property;
      generate a spatial variance by computing at least two years of ratios, the ratios, corresponding to the selected real estate price data set selected from a group consisting of subject real property prices to the real estate prices in the same zip code from the real estate price data set, the subject real property prices to the real estate prices in the same city situs from the real estate price data set, and the subject real property prices to the real estate prices in the same county from the real estate price data set;

compute a spatial distortion by determining a maximum value in the spatial variance and subtracting the maximum value from the current year spatial variance; and produce a distortion ratio score to indicate a likelihood of fraud based on the spatial distortion.

8. A system for detecting fraud during a real estate transaction, comprising:

a computer processor; and a memory storing program instructions, said program instructions when executed by the computer processor causes the computer processor to:

access a database of real property prices in a geographic area in which a subject real property is located;

use data from the database or data from a requestor to generate a temporal data set comprising a current yearly real property price for the subject real property and a set of past yearly real property prices for the subject real property;

generate from the database a spatial data set comprising a current yearly real property price for real property with similar characteristics as the subject real property and a set of past yearly real property prices for real property with similar characteristics as the subject real property;

generate a set of temporal variances;

generate a set of spatial variances;

compute a spatial distortion based on the set of spatial variances;

compute a temporal distortion based on the set of temporal variances;

compute a total distortion by adding the temporal distortion to the spatial distortion; and produce a distortion ratio score to indicate a likelihood of fraud based on the total distortion.

* * * * *

UNITED STATES PATENT AND TRADEMARK OFFICE
CERTIFICATE OF CORRECTION

PATENT NO. : 7,599,882 B2  Page 1 of 1
APPLICATION NO. : 10/713348
DATED : October 6, 2009
INVENTOR(S) : Christopher L. Cagan It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1377 days.

Signed and Sealed this

Twenty-eighth Day of September, 2010

David J. Kappos
*Director of the United States Patent and Trademark Office*